US009846727B2

(12) United States Patent
Maloy et al.

(10) Patent No.: US 9,846,727 B2
(45) Date of Patent: *Dec. 19, 2017

(54) SYSTEM AND METHOD FOR GENERATING AND UPDATING LOCATION CHECK DIGITS

(71) Applicant: Vocollect, Inc., Pittsburgh, PA (US)

(72) Inventors: James D. Maloy, Greensburg, PA (US); Michael Kusar, Gibsonia, PA (US); Alexander Mracna, Seven Fields, PA (US); Venkatesh Narayan, Monroeville, PA (US); Jeffrey Thorsen, Monroeville, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,160

(22) Filed: Jan. 7, 2016

(65) Prior Publication Data
US 2016/0117367 A1 Apr. 28, 2016

Related U.S. Application Data

(63) Continuation of application No. 14/513,290, filed on Oct. 14, 2014, now Pat. No. 9,235,615, which is a continuation of application No. 13/117,365, filed on May 27, 2011, now Pat. No. 8,868,519.

(51) Int. Cl.
*G06F 7/00* (2006.01)
*G06F 17/30* (2006.01)
*G06Q 10/08* (2012.01)
*G06Q 10/06* (2012.01)
*G06F 17/00* (2006.01)

(52) U.S. Cl.
CPC .. *G06F 17/30525* (2013.01); *G06F 17/30241* (2013.01); *G06F 17/30371* (2013.01); *G06Q 10/063* (2013.01); *G06Q 10/087* (2013.01)

(58) Field of Classification Search
CPC ......... G06F 17/30371; G06F 17/30525; G06F 17/30241; G06Q 10/087; G06Q 10/063
See application file for complete search history.

(56) References Cited

U.S. PATENT DOCUMENTS 5,303,149 A * 4/1994 Janigian ................. G06Q 20/00
5,757,923 A * 5/1998 Koopman, Jr. ......... G06F 7/584
380/46
7,567,905 B1 * 7/2009 Sacks ................... G06Q 10/087
704/231
2004/0138781 A1 * 7/2004 Sacks ................... G06Q 10/087
700/245

(Continued)

Primary Examiner — Kannan Shanmugasundaram
(74) Attorney, Agent, or Firm — Additon, Higgins & Pendleton, P.A.

(57) ABSTRACT

A method, apparatus, and program product for generating check data for a location within an area of a workspace include receiving an identifier for a selected location that has check data associated therewith. Candidate check data for use with the selected location is generated. The candidate check data is evaluated for a match against at least one of existing check data for the selected location or check data associated with a related location. Based on the evaluation, a determination is made of whether the candidate check data is acceptable for use for the selected location.

20 Claims, 5 Drawing Sheets

(56) References Cited

U.S. PATENT DOCUMENTS

2007/0016460 A1* 1/2007 Weiss ................. G06Q 10/06
  705/7.13
2007/0080930 A1* 4/2007 Logan ................. G06Q 10/06
  345/156

* cited by examiner

SYSTEM AND METHOD FOR GENERATING AND UPDATING LOCATION CHECK DIGITS

CROSS-REFERENCE TO RELATED APPLICATIONS

The present application claims the benefit of U.S. patent application Ser. No. 14/513,290 for a System and Method for Generating and Updating Location Check Digits filed Oct. 14, 2014 (and published Jan. 29, 2015 as U.S. Patent Publication No. 2015/0032709), now U.S. Pat. No. 9,235,615, which claims the benefit of U.S. patent application Ser. No. 13/117,365 for a System and Method for Generating and Updating Location Check Digits filed May 27, 2011 (and published Nov. 29, 2012 as U.S. Patent Application Publication No. 2012/0303646), now U.S. Pat. No. 8,868,519. Each of the foregoing patent applications, patent publications, and patents is hereby incorporated by reference in its entirety.

FIELD OF THE INVENTION

Embodiments of the invention relate to computing systems, and in particular task management systems such as voice driven system that utilize check digits therein.

BACKGROUND

Speech recognition has simplified many tasks in the workplace by permitting hands-free communication with a computer as a convenient alternative to communication via conventional peripheral input/output devices. A user may enter data by voice using a speech recognizer and commands or instructions may be communicated to the user by a speech synthesizer. Speech recognition finds particular application in mobile computing devices in which interaction with the computer by conventional peripheral input/output devices is restricted.

For example, wireless wearable terminals can provide a user performing work-related tasks with desirable computing and data-processing functions while offering the user enhanced mobility within the workplace. One particular area in which users rely heavily on such wireless wearable terminals is inventory management. Inventory-driven industries rely on computerized inventory management systems for performing various diverse tasks, such as food and retail product distribution, manufacturing, and quality control. An overall integrated management system involves a combination of a central computer system for tracking and management, and the people who use and interface with the computer system in the form of order fillers and other users. In one scenario, the users handle the manual aspects of the integrated management system under the command and control of information transmitted from the central computer system to the wireless wearable terminal.

As the users process their orders and complete their assigned tasks, a bi-directional communication stream of information is exchanged over a wireless network between the users wearing wireless terminals and the central computer system that is directing multiple users and verifying completion of their tasks. Information received by each wearable terminal from the central computer system is translated into voice instructions or text commands for the corresponding user. Typically, the user wears a headset coupled with the wearable device. The headset includes a microphone for voice data entry and an ear speaker for audio output feedback. Responses from the user are input into the wireless wearable terminal by the headset microphone and communicated from the wearable terminal to the central computer system. Similarly, instructions from the central computer are delivered to the user via the headset speaker. Using such wearable terminals, users may perform assigned tasks virtually hands-free without equipment to juggle or paperwork to carry around. Because manual data entry is eliminated or reduced, users can perform their tasks more accurately and efficiently.

An illustrative example of a set of user tasks suitable for a wireless wearable terminal with voice capabilities may involve initially welcoming the user to the computerized inventory management system and defining a particular task or order, for example, filling a load for a particular truck scheduled to depart from a warehouse. The user may then answer with a particular area (e.g., freezer) that they will be working in for that order. The system then vocally directs the user to particular aisles and bins to pick particular quantities of various items. The user vocally confirms each location and the number of picked items. For instance, the user reads a label located at the particular location of a single stocked item, such as a slot or bin. The label has one or more numeric or alphanumeric "check digits" printed on it that are associated with the product and/or bin. The user then speaks or otherwise enters the check digits into the wearable terminal.

The check digits function, in part, to confirm that the user is located at the correct location for the items to be picked. That is, the wearable terminal or central system receives data consistent with the check digits spoken or entered by the user, and verifies that the spoken digits are correct for that order or pick task. An alert is provided to the user if the spoken or entered check digits do not match stored check data correlated to the bin/slot. In this manner, the chances of the user being at the wrong slot and/or picking an unspecified or undesired product are greatly reduced. After the location is confirmed and the pick made, and all related tasks are completed, the user may be directed to a loading dock or bay for a particular truck to receive the order. As may be appreciated, the specific operations of the wearable terminal and the specific communications exchanged between the wearable terminal and the central computer system are generally task specific.

Despite the efficiencies and accuracy afforded by wireless wearable terminals and the common use of check digits and labels, location problems in inventory retrieval and management still persist. For purposes of explanation, a "location" refers to a uniquely identified space in a workspace or warehouse, where generally a single item is stocked. A location is then identified primarily by an identifier, such as a "slot number". Based on the size and layout of the warehouse location, identifiers like slot numbers may be duplicated numerous times throughout different areas of the workspace, such as different levels, sections, aisles, floors, etc. However, the combination of the area identifiers for the floor, aisle, section, level, etc., along with the location identifiers, or slot numbers, should be unique. The locations (e.g., slot-numbers) are typically defined within a warehouse before inventory is stocked therein. Such a set up is often time consuming and leads to inefficiencies. It requires detailed knowledge of the dimensions of inventory being added, the perceived regularity of selecting that inventory, and detailed knowledge of the layout, slots, and bins associated with the warehouse for the inventory management system. It also requires constant printing of check digit labels, travel to their location, verification that is it correct, and application of the labels, and then travel to a computer to update the location with the check digit for each check digit.

Varying inventory requirements and bin usage at the locations can also lead to inefficiencies. For example, inventory that is discontinued may lead to an empty location. Moreover, if a location is too large for the inventory, there is wasted space that could be used for smaller inventory. Meanwhile, new types of inventory may be received that are similar to other types of inventory, or that are often picked with other types of inventory. These new types of inventory may be placed in an inefficient location because of their receipt later in time than earlier inventory.

However, even when a warehouse facility has been arranged with suitable location information including slot numbers and associated check digits, problems still persist with respect to the user interaction with the check digit information. Specifically, check digit memorization by a user due to task repetition remains a problem. Furthermore, check digit duplication at adjacent or related locations can also be a problem due to the random location of slot numbers and their associated check digits within the warehouse.

For example, many users fill orders and perform other activities in the same areas and locations of the warehouse, day after day. Therefore, repetition of the tasks at the same locations allows them to eventually memorize the check digits for frequently-visited locations. Additionally, users may have financial incentives for completing their work more rapidly. These factors may lead the user to speak the check digits before they actually arrive at the location. This opens up the opportunity for items to be picked from the wrong location, if the user becomes distracted while traveling to where the item to be picked, actually is located. The primary solution for avoiding these issues is to change the check digits on a regular basis. However, as noted above, this involves considerable effort and expense.

Duplication is also an issue due to the randomness of assigning specific locations to their associated check digits. Currently, check digits are generated randomly without consideration to the physical layout of the locations in the workspace. For example, a slot with a location identifier or slot number "123" may be physically adjacent to locations with slot numbers "122" and "124", as one would expect. However, the "123" location may just as well be physically adjacent to slots numbered "121", "126", "133", or any other slot number. If, by chance, two adjacent slots are randomly assigned matching check digits (i.e., the same check digits), this significantly increases the chance of the incorrect item being picked. Another problem scenario exists when location identifiers or slot numbers are duplicated in other areas of the warehouse, such as multiple aisles or sections of the warehouse. For example, there may be an aisle/section "1" with slots that are numbered "100" to "199", and near it there may be an aisle/section "2" with slots bearing the same slot numbers. If Slot 123 in Aisle 1 and Slot 123 in Aisle 2 have the same check digits, this increases the chances of an incorrect item being picked. As a result, it is highly desirable to prevent these sorts of duplications while generating and/or changing check digits for locations. The primary concern is to avoid matching check digits for such locations; similar-but-distinct check digits are generally not an issue.

Accordingly, there is still an unmet need to efficiently and cost-effectively categorize bins and locations within an inventory management system. There is further a need to provide users with a quick and efficient way to assign check digits that prevents wasted time and wasted bin locations.

These issues and other needs in the prior art are met by the invention as described and claimed below.

SUMMARY

Embodiments of the invention address the deficiencies of the prior art by providing a method, apparatus, and program product to generate check data for a location within an area of a workspace. The invention uses an identifier for a selected location that has check data associated therewith and generates candidate check data for use with the selected location. The candidate check data is evaluated for a match against at least one of existing check data for the selected location or check data associated with a related location. Based on the evaluation, it is determined whether the candidate check data is acceptable for use for the selected location.

Generally, the use of the invention is directed to generating check data for existing defined locations, such as to change the existing check data digits or to correct a problem with the existing check data. Of course, the invention has applicability as well to assigning new check digits to new locations that have check data associated therewith for performing tasks.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Hardware and Software Environment

Figure 1:
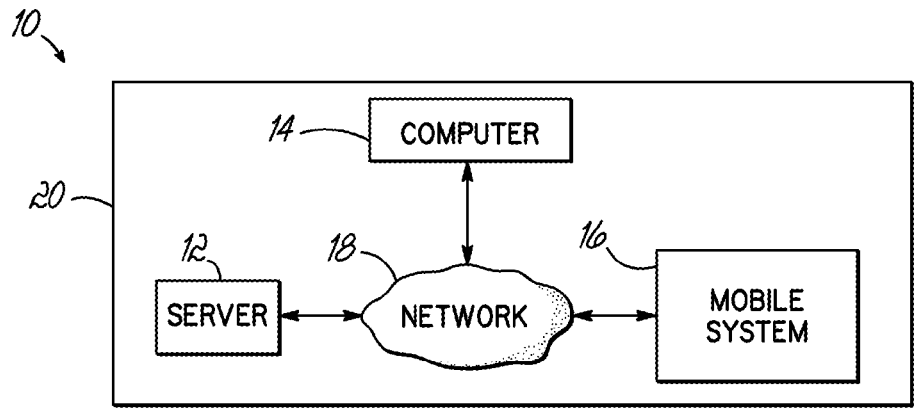
FIG. 1 is a diagrammatic illustration of a voice-enabled task management system that includes a server, portable computer, and/or a mobile system consistent with embodiments of the invention.

Turning now to the drawings, wherein like numbers denote like parts throughout the drawings, FIG. 1 is a diagrammatic illustration of a task management system 10 consistent with embodiments of the invention. The system 10 may include a server 12, a portable computing system 14 (illustrated as, and referred to hereinafter, as "computer" 14), and a mobile system 16 that are configured to communicate through at least one network 18, which may include at least one private communications network (e.g., such as an intranet) and/or at least one public communications network (e.g., such as the Internet).

Figure 2:
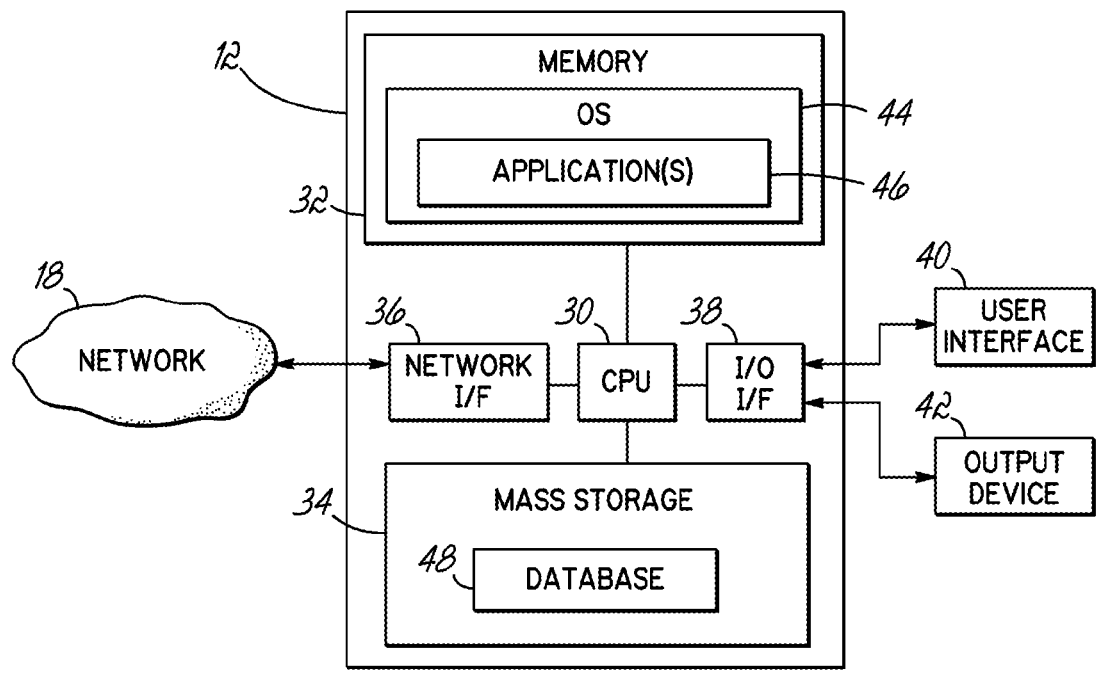
FIG. 2 is a diagrammatic illustration of hardware and software components of the server of FIG. 1.

FIG. 2 is a diagrammatic illustration of the server 12 consistent with embodiments of the invention. In specific embodiments, the server 12 is a computing system, such as a computer, computing device, server, disk array, or programmable device, including a handheld computing device, a networked device (including a computer in a cluster configuration), a mobile telecommunications device, a video game console (or other gaming system), etc. As such, the server 12 may operate as a multi-user computer or a single-user computer. The server 12 includes at least one central processing unit (CPU) 30 coupled to a memory 32. Each CPU 30 is typically implemented in hardware using circuit logic disposed on one or more physical integrated circuit devices or chips and may be one or more microprocessors, micro-controllers, FPGAs, or ASICs. Memory 32 may include RAM, DRAM, SRAM, flash memory, and/or another digital storage medium, and also typically implemented using circuit logic disposed on one or more physical integrated circuit devices, or chips. As such, memory 32 may be considered to include memory storage physically located elsewhere in the server 12, e.g., any cache memory in the at least one CPU 30, as well as any storage capacity used as a virtual memory, e.g., as stored on a mass storage device 34, another computing system (not shown), a network storage device (e.g., a tape drive) (not shown), or another network device (not shown) coupled to the server 30 through at least one network interface 36 (illustrated and referred to hereinafter as "network I/F" 36) by way of the 18.

The server 12 is coupled to at least one peripheral device through an input/output device interface 38 (illustrated as, and hereinafter, "I/O I/F" 38). In particular, the server 12 receives data from a user through at least one user interface 40 (including, for example, a keyboard, mouse, a microphone, and/or other user interface) and/or outputs data to the user through at least one output device 42 (including, for example, a display, speakers, a printer, and/or another output device). Moreover, in some embodiments, the I/O I/F 38 communicates with a device that is operative as a user interface 40 and output device 42 in combination, such as a touch screen display (not shown).

The server 12 is typically under the control of an operating system 44 and executes or otherwise relies upon various computer software applications, sequences of operations, components, programs, files, objects, modules, etc., consistent with embodiments of the invention. In specific embodiments, the server 12 executes or otherwise relies on one or more applications 46 that are configured provide task messages or task instructions to the computer 14 or mobile system 16. The task messages or task instructions are communicated to the computer 14 and/or mobile system 16 for a user thereof to execute a task, which, e.g., may involve travel to a specified location and/or slot thereof in the warehouse 20 to perform a task. The one or more applications 46 are also configured to store or adjust check digits in a database 48 within the mass storage 34 in response to updates from the computer 14 and/or mobile system 16.

Figure 3:
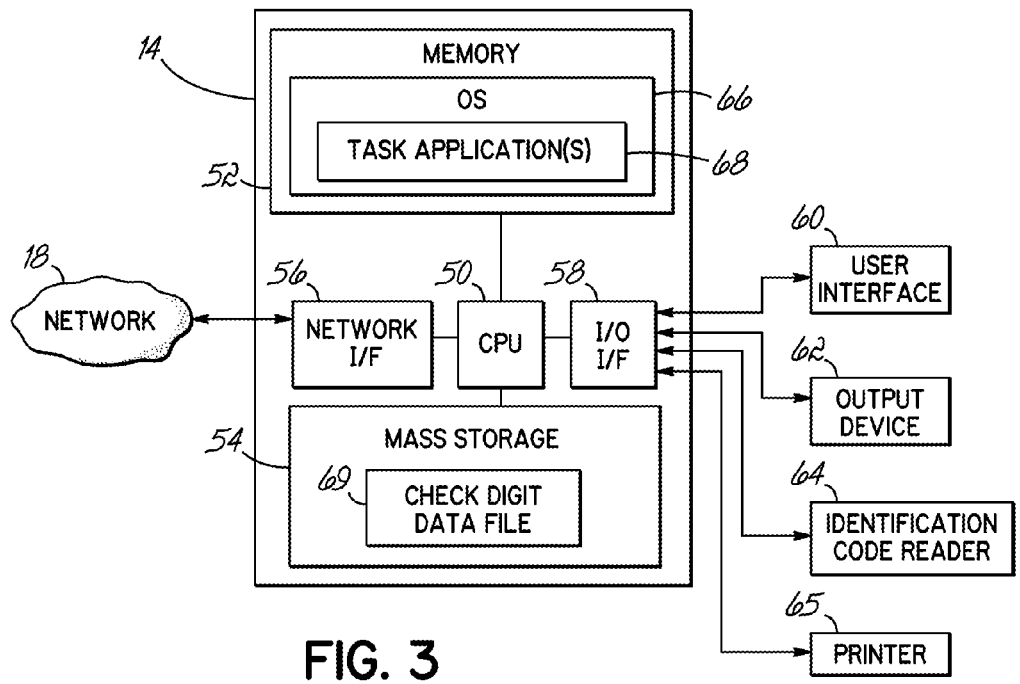
FIG. 3 is a diagrammatic illustration of hardware and software components of the portable computer of FIG. 1.

The computer 14 is configured to generate a check digit for a location, such as an existing defined location, as well as store the generated check digit in a data file to later update the database 48 and/or update the database 48 with the generated check digit. The computer 14 may also be configured to automatically print a generated check digit, such as in response to generating the check digit and/or in response to a successful update at the database 48. In any event, FIG. 3 is a diagrammatic illustration of the computer 14 consistent with embodiments of the invention. In specific embodiments, the computer 14 is a mobile computing system, such as a "laptop" computing system, a tablet computing system, a handheld computing device, a mobile telecommunications device, or other mobile computing system that may operate as a multi-user computer or a single-user computer. As such, and similarly to the server 12, the computer 14 includes at least one CPU 50, a memory 52, a mass storage device 54, a network I/F 56 coupled to the network 18, and an I/O I/F coupled to at least one user interface 60 (which, with respect to the computer 14, may additionally include a barcode reader) and/or outputs data at least one output device 62. Additionally, the I/O I/F 58 is coupled to at least one identification code reader 64 (e.g., an RFID chip reader, a bar code reader) configured to read an identifier (e.g., such as stored in an RFID chip or indicated on a bar code label, respectively), and at least one printer 65 that may print generated check digits.

The computer 14, again, similarly to the server 12, is typically under the control of an operating system 66 and executes or otherwise relies upon various computer software applications, sequences of operations, components, programs, files, objects, modules, etc., consistent with embodiments of the invention. In specific embodiments, the computer 14 executes or otherwise relies on one or more task applications 68 that processes task messages or task instructions for the user (e.g., by displaying and/or converting the task messages or task instructions into speech output). The task applications 68 also generate a check digit and are configured to store that generated check digit in a check digit data file 69 within the mass storage 54. In specific embodiments, the check digit data file 69 may initially mirror at least a portion of the check digits stored in entries of the database 48 of the server 12 such that the task applications 68 can generate the check digit with respect to the entries in the check digit data file 69. The task applications 68 may be further configured to transmit at least a portion of the check digit data file 69 to the server 12 to update the database 48 therein.

The mobile system 16, similarly to the computer 14, is configured to generate a check digit for a location as well as store the generated check digit in a data file to later update the database 48 and/or update the database 48 with the generated check digit. Additionally, the mobile system 16 is configured to implement a voice dialog flow (e.g., a voice enabled set of steps, such as for a pick-and-place, voice-assisted, or voice-directed operation), capture speech input, and execute business logic. The mobile system 16 may also be configured to automatically print a generated check digit, such as in response to generating the check digit and/or in response to a successful update at the database 48.

Figure 4:
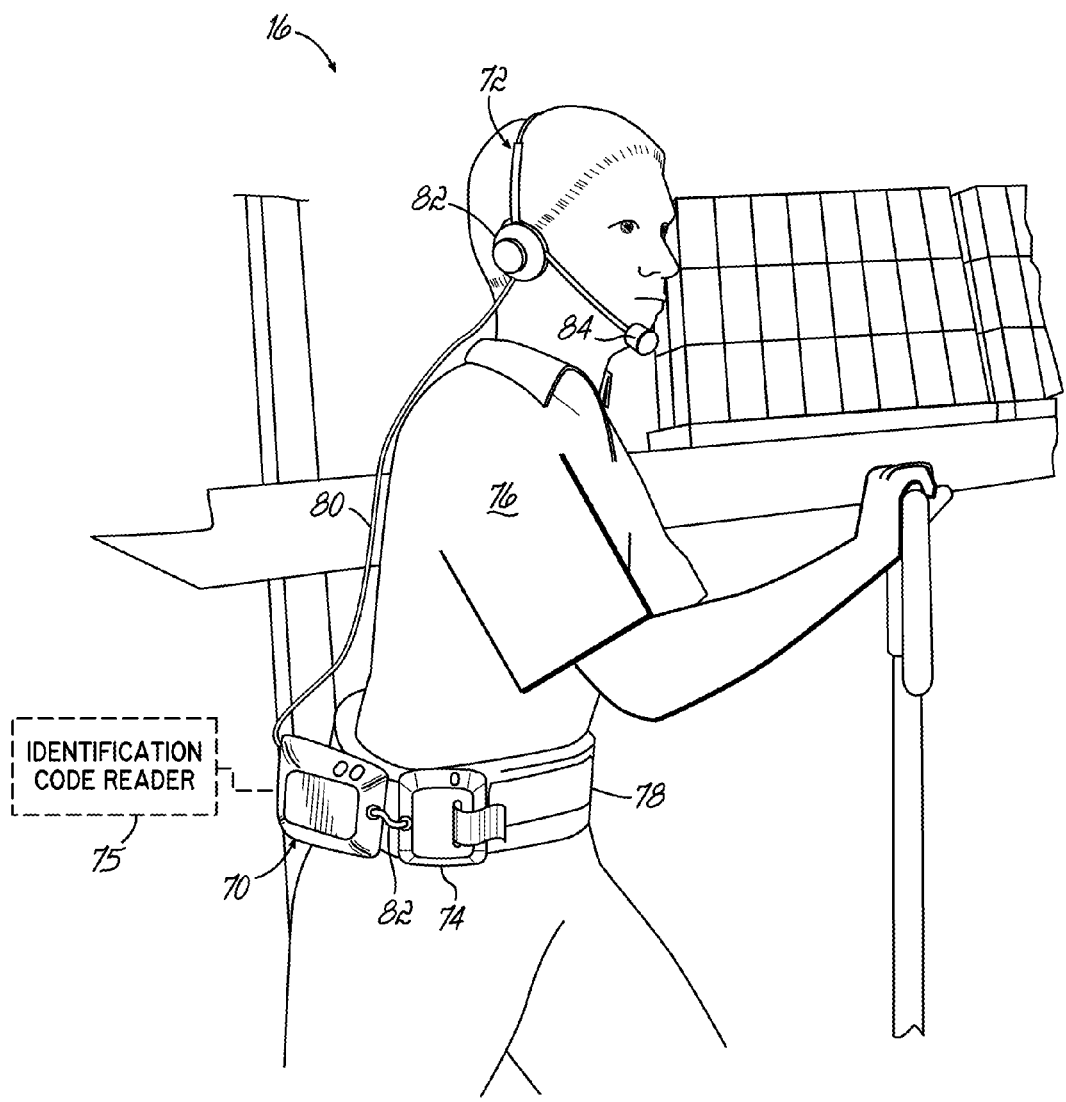
FIG. 4 is an illustration of the mobile system of FIG. 1 that further illustrate a mobile device and headset thereof.

FIG. 4 is an illustration of a mobile system 16 consistent with embodiments of the invention. In specific embodiments, the mobile system 16 includes a portable and/or wearable computer or device 70 (hereinafter, "mobile device" 70), a user input/output device 72, such as a headset (the user input/output device 72 will be referred to as "headset" 72 hereinafter), and a printer 74 to print check digits. As illustrated in FIG. 3, the mobile device 70 and the printer 74 are wearable devices worn by a user 76, such as on a belt 78. In alternative embodiments, the mobile device 70 is carried or otherwise transported, such as on the user's forearm, or on a lift truck, harness, or other manner of transportation. Optionally, the mobile system 16 may further include an identification code reader 75 (e.g., an RFID chip reader, a bar code reader) configured to read an identifier (e.g., such as stored in an RFID chip or indicated on a bar code label, respectively).

In some embodiments, the user 76 interfaces with the mobile device 70 (and the mobile device 70 interfaces with the user 76) through the headset 72, which is coupled to the mobile device 70 through a cord 80. In alternative embodiments, the headset 72 is a wireless headset and coupled to the mobile device 70 through a wireless signal (not shown). The headset 72 includes one or more speakers 82 and one or more microphones 84. The speaker 82 is configured to play audio (e.g., such as speech output associated with a voice dialog to instruct the user 76 to perform an action), while the microphone 84 is configured to capture speech input from the user 76 (e.g., such as for conversion to machine readable input). As such, and in some embodiments, the user 76 interfaces with the mobile device 70 hands-free through the headset 72.

The printer 74 is connected to the mobile device 70 through a cord 82. In alternative embodiments, the printer 74 is a wireless printer and coupled to the mobile device 70 through a wireless signal (not shown). The printer 74 is used to print a generated check digit.

Figure 5:
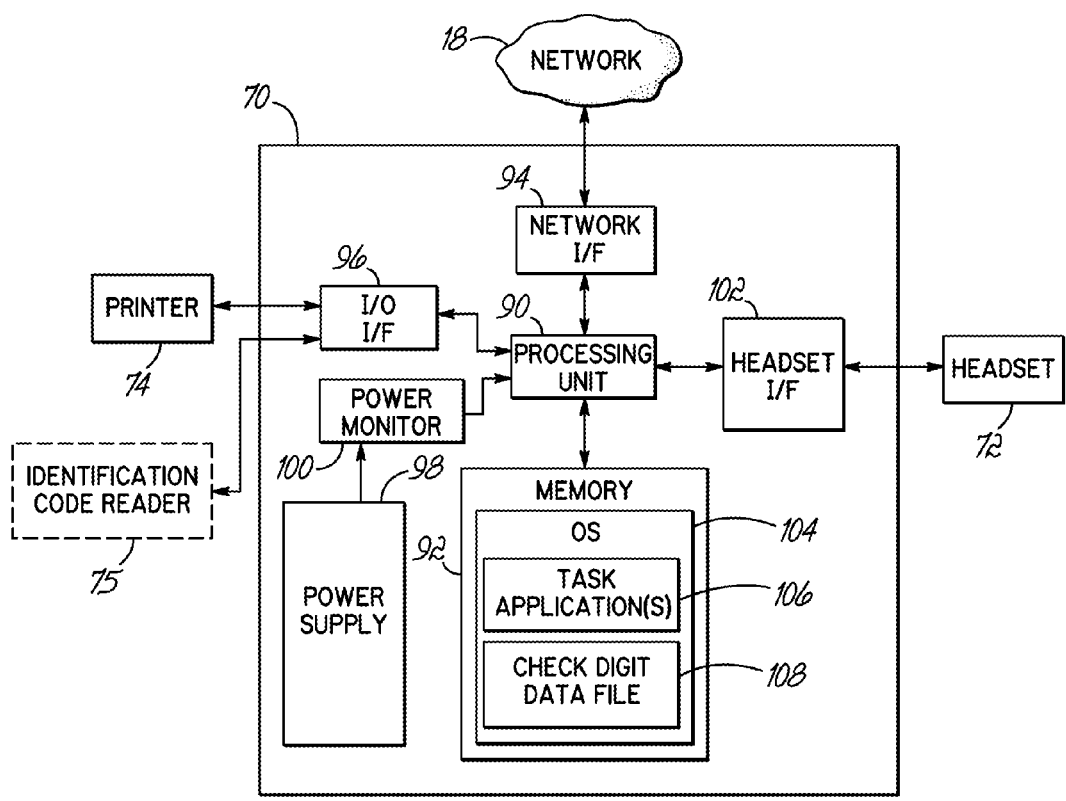
FIG. 5 is a diagrammatic illustration of hardware and software components of the mobile system of FIG. 4.

FIG. 5 is a diagrammatic illustration of at least a portion of the components of the mobile device 70 consistent with embodiments of the invention. The mobile device 70 includes at least one processing unit 90 coupled to a memory 92. Each processing unit 90 is typically implemented in hardware using circuit logic disposed in one or more physical integrated circuit devices, or chips. Each processing unit 90 may be one or more microprocessors, micro-controllers, field programmable gate arrays, or ASICs, while memory 92 may include RAM, DRAM, SRAM, flash memory, and/or another digital storage medium, and that is also typically implemented using circuit logic disposed in one or more physical integrated circuit devices, or chips. As such, memory 92 is considered to include memory storage physically located elsewhere in the mobile device 70, e.g., any cache memory in the at least one processing unit 90, as well as any storage capacity used as a virtual memory, e.g., as stored on a mass storage device, a computer, and/or another device coupled to the mobile device 70, including coupled to the mobile device 70 through at least one network I/F 94 by way of the network 18. The mobile device 70, in turn, couples to the network 18 through the network I/F 94 with at least one wired and/or wireless connection.

In some embodiments, the mobile device 70 additionally includes at least one input/output interface 96 (illustrated as, and hereinafter, "I/O I/F" 96) configured to communicate with at least one peripheral other than the headset 72. Such a peripheral includes the printer 74 and/or may include training device (e.g., to coach a new user through training to use the mobile device 70, headset 72, and/or a system to which they are coupled), an image scanner, an identification code reader (e.g., a barcode reader or an RFID reader), a monitor, a user interface (e.g., keyboard, keypad), an output device, a touch screen, to name a few. In specific embodiments, the I/O I/F 96 includes at least one peripheral interface, including at least one of one or more serial, universal serial bus (USB), PC Card, VGA, HDMI, DVI, and/or other interfaces (e.g., for example, other computer, communicative, data, audio, and/or visual interfaces) (none shown). Moreover, the mobile device 70 is configured to communicate with the printer 74 through the cord 82 and/or wirelessly. In specific embodiments, the mobile device 70 couples to the printer 74 through the BlueTooth® open wireless technology standard that is known in the art.

The mobile device 70 also includes a power supply 98, such as a battery, rechargeable battery, rectifier, and/or other power source. The mobile device 70 monitors the voltage from the power supply 98 with a power monitoring circuit 100. In some embodiments, and in response to the power monitoring circuit 90 determining that the power from the power supply 98 is insufficient, the mobile device 70 shuts down to prevent potential damage. The mobile device 70 is configured to communicate with the headset 72 through a headset interface 102 (illustrated as, and hereinafter, "headset I/F" 102), which is in turn configured to couple to the headset 72 through the cord 80 and/or wirelessly. In specific embodiments, the mobile device 70 couples to the headset 72 through the BlueTooth® open wireless technology standard that is known in the art.

The mobile device 70 may be under the control and/or otherwise rely upon various software applications, components, programs, files, objects, modules, etc. (hereinafter, "program code") consistent with embodiments of the invention. This program code may include an operating system 104 (e.g., such as a Windows Embedded Compact operating system as distributed by Microsoft Corporation of Redmond, Wash.) as well as one or more software applications (e.g., configured to operate in an operating system or as "stand-alone" applications). As such, the memory 92 may also be configured with one or more task applications 106. The one or more task applications 106, similarly to those of the computer 14, process messages or task instructions for the user 76 (e.g., by displaying and/or converting the task messages or task instructions into speech output). The task applications 106 also generate a check digit and are configured to store that generated check digit in a check digit data file 108 within the memory 92. Similarly to the check digit data file 69 of the computer 14, the check digit data file 108 of the mobile system 16 may initially mirror at least a portion of the check digits stored in entries of the database 48 of the server 12 such that the task applications 106 can generate the check digit with respect to the entries in the check digit data file 108. The task applications 106 may be further configured to transmit at least a portion of the check digit data file 108 to the server 12 to update the database 48 therein.

In some embodiments, a suitable mobile device 70 for implementing the present invention is a Talkman® wearable computer available from Vocollect, Inc., of Pittsburgh, Pa. The mobile device 70 is utilized in the system 10, which may be a voice-enabled system, in conjunction with speech recognition technology for documentation and/or communication. The headset 72 provides hands-free voice communication between the user 76 and the mobile device 70. For example, in one embodiment, the task application(s) 106 implement a dialog flow, such as for a pick-and-place, voice-assisted, or voice-directed operation. The task application(s) 106 communicate with the server 12 to receive task messages or task instructions. In turn, the task application(s) 106 can capture speech input for subsequent conversion to a useable digital format (e.g., machine readable input) by application(s) 46 the server 12 (e.g., to update the database 48 of the server 12).

A person having ordinary skill in the art will recognize that the environments illustrated in FIGS. 1-5 are not intended to limit the scope of embodiments of the invention. In particular, the server 12, computer 14, and/or the mobile system 16 may include fewer or additional components, or alternative configurations, consistent with alternative embodiments of the invention. An alternative mobile system 16 may also be used consistent with embodiments of the invention. For example, the mobile system 16 may include a mobile device 70 and headset 72 that communicate wirelessly. Also for example, the mobile system 16 may include a mobile device 70 and headset 72 that are incorporated with each other in a single, self-contained unit. As such, the single, self contained mobile system may be worn by the user 76.

Thus, a person having skill in the art will recognize that other alternative hardware and/or software environments may be used without departing from the scope of the invention. For example, a person having ordinary skill in the art will appreciate that the server 12, computer 14, and/or mobile system 16 may include more or fewer applications disposed therein. As such, other alternative hardware and software environments may be used without departing from the scope of embodiments of the invention. Moreover, a person having ordinary skill in the art will appreciate that the terminology used to describe various pieces of data, task messages, task instructions, voice dialogs, speech output, speech input, and machine readable input are merely used for purposes of differentiation and are not intended to be limiting.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system (e.g., the VCS 12 and/or mobile system 16), and that, when read and executed by one or more processors of the computing system, cause that computing system to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical and tangible recordable type media such as volatile and nonvolatile memory devices, floppy and other removable disks, hard disk drives, optical disks (e.g., CD-ROM's, DVD's, Blu-Ray disks, etc.), among others.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows for Embodiments

Figure 6:
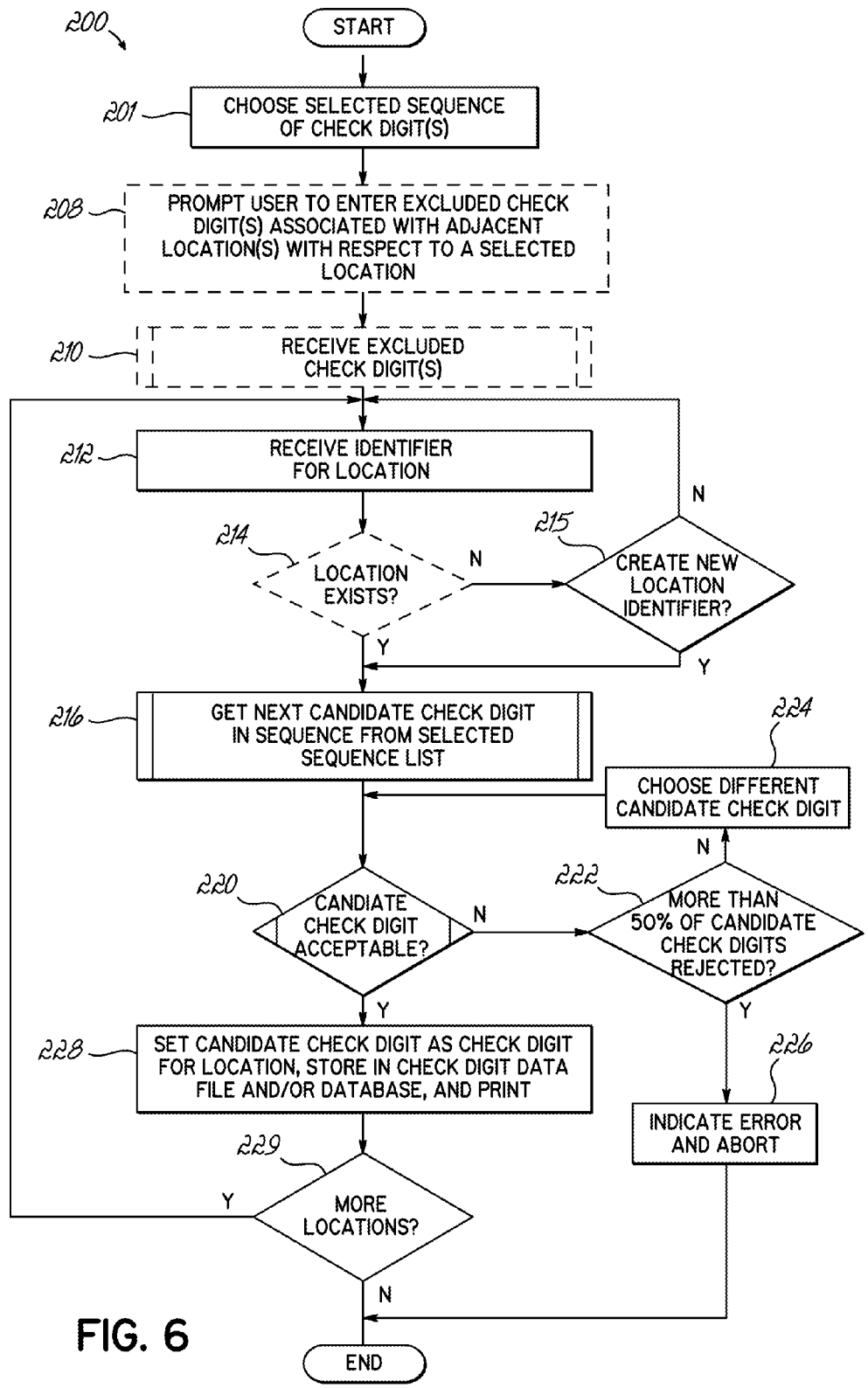
FIG. 6 is a flowchart illustrating a sequence of operations that may be executed by the portable computer or mobile system of FIG. 1 to generate a candidate check digit for a location and determine whether it is acceptable to use thereat.

FIG. 6 is a flowchart 200 illustrating a sequence of operations that may be performed by a computer and/or mobile system to determine whether candidate check data is acceptable to use for a particular location consistent with embodiments of the invention. For example, a "location" of a warehouse may indicate a uniquely identified space in the warehouse usually for one or more items. Generally, it refers to a space where a single item is stocked, as noted above. Such a location may be a bin or a slot in an aisle of shelves, a section of the warehouse, or some other defined and discrete area of the warehouse or the workspace at issue. A user may wish to associate check data with a particular defined location as a new check data to replace existing check data. That location may include a bin or slot, a portion of a shelf, an entire shelf, or some other suitable space. As noted, the invention has particular applicability to existing locations, for changing existing check data. However, it may be applied to new locations as well that have check data associated therewith, such as to be assigned when setting up a new location or area. Therefore, a location having check data associated therewith refers to an existing location with existing check data as well as a new location to get initial check data. Throughout the application, the verification information or check data is referred to generally as check data. One embodiment of such check data is also referred to as "check digits", and thus, that term is used as well to refer to the check data.

By way of example, in a pick-and-place, voice-assisted, or voice-directed operation, the user may need to define a location from which to pick an item, or change the check digit for the location from which to pick an item. Thus, embodiments of the invention allow the user to quickly label a location with a check digit in an efficient process that handles the check digit generation and/or update, label generation, and database management in a flexible, possibly mobile, way.

In the start of the process 200 in FIG. 6, a sequence of check data may be selected to be used for determining candidates for new check data to replace the check data for an existing location or otherwise assign check data to a location. In appropriate memory, such as in a server 12, computer 14, or mobile system or device, is stored one or more pre-set and randomly ordered sequences of check data or check digits. The check digits in a given sequence of one embodiment of the invention follow a specific content and length. For example, one sequence list may contain two-digit values, such as in a range of 00 to 99. Another sequence list may contain various permutations provided by a three-character check digit (0-9 or letters A-Z). Any number of such sequences may be stored in memory and used in the software. Each sequence list is stored and indexed in a random order. For example, the two-digit sequence might be stored as 07, 65, 16, 29, . . . , etc., but generally, not as 00, 01, 02, . . . , etc. As with stored data, the particular check digit in a sequence might be pointed to, or indicated by, an index that is used and maintained, as noted below.

Referring to FIG. 6, in step 201, the user specifies which of the stored sequences of check digits is to be used and referred to when generating candidates for new or updated check digits for a location. In one embodiment, once a sequence is selected at the start of the process 200, it might be applied to each activation of the selection process for various locations, until the user opts to select a different sequence. Alternatively, the invention might require the user to select a sequence each time the selection process is used.

Initially, and consistent with embodiments of the invention, a user typically selects a location or a group of N locations, such as new or existing locations, to which to assign a check digit. Generally, the locations will have particular identifiers for use in the invention. For example, one typical location identifier is a "slot number". Therefore, in various examples herein, the slot number is used as a particular location identifier for the invention, although the invention is not limited to one particular location identification.

When a sequence is selected, the user is optionally prompted to enter one or more excluded check digits that are to be used to accept or reject candidates (block 208). In one embodiment, excluded check digits might be associated with one or more adjacent locations to the selected location. While check digits of adjacent locations might be visually determined by the user and entered, other excluded check digits might be entered. This allows the server, computer, or mobile system to determine a candidate check digit from the selected sequence list to assign to the selected location. The excluded check digit(s) associated with the respective adjacent location(s) from the user are received (block 210). As noted, an excluded check digit might be a check digit which may not be used or assigned to the selected location because it would already exist adjacent to or near the selected location. Therefore, the new or updated check digits would not duplicate the existing check digits for the existing adjacent locations. As noted, other reasons may exist for the excluded check data as well.

Once the excluded check digit(s), such as those associated with the respective adjacent location(s), have been received (block 210), the invention may begin the process of generating check data for locations of interest. This may be done in an iterative fashion for more than one location. An identifier for the location is received (block 212). The identifier may be entered through a user input device, such as a keyboard, through user speech input (e.g., voiced utterances of the user that are converted to machine readable input for processing), or through an identification code reader (e.g., a bar code or RFID chip reader). Alternatively, a list of the group of N locations might be stored in appropriate memory and accessed for generating check data. In an optional step, particularly when the location is entered through speech input, the selected location is analyzed further to determine whether it exists (block 214). For example, the computer and/or mobile system may determine from its local memory whether the location exists, or transmit the location identifier to a server for that server to determine whether the location exists, or is defined within the workspace, such as a warehouse. When the location does not exist or is not defined as a location within the workspace ("No" branch of decision block 214), the user is queried to confirm whether to create it as a new location identifier (block 215). If the user responds affirmatively ("Yes" branch exiting block 215), processing continues to block 216. If the user responds negatively ("No" branch exiting block 215), then the sequence of operations returns to block 212.

When a location is identified, such as by a suitable location identifier (e.g., slot number), at least one candidate check digit is determined from a database of check digit(s) (block 216). Specifically, the sequence list of check digit candidates is stored appropriately in memory, and the sequence list that was selected, such as in block 201 of FIG. 6, is used to determine or provide the candidate for the new or updated check digit.

In response to determining at least one candidate check digit, a candidate check digit is evaluated against a number of different checks and criteria in the invention to see if the determined candidate check digit is suitable and acceptable (block 220). When the candidate check digit is rejected or not acceptable ("No" branch of decision block 220), the next index value for the selected sequence or sequence list (from block 201) is used to point to a new candidate from the sequence that is to be evaluated to see if it is acceptable. The index of the sequence is incremented with the selection of each replacement check digit or the rejection of each check digit candidate, and the index is saved. In the next activation of process 200 or the next loop through block 220, the save index is used to point to the next available check digit candidate.

During the evaluation or validation process (block 220), it is also determined whether more than about fifty percent of the candidate check digits have been rejected as invalid or unacceptable (block 222). When less than about fifty percent of the candidate check digits have been rejected ("No" branch of decision block 222), a different candidate check digit is chosen (block 224) based on the indexed sequence of candidates and the sequence of operations proceeds back to block 220. However, when more than about fifty percent of the candidate check digits have been rejected ("Yes" branch of decision block 222), an error is indicated and the sequence of operations to determine a check digit is aborted or stopped (block 226).

Returning to block 220, when a candidate check digit is acceptable ("Yes" branch of decision block 220), the acceptable candidate check digit is set as the check digit for the location (e.g., set as a "new" or "replacement" check digit for the location), stored in a check digit data file and/or a database, and printed (block 228). The accepted check digit may be printed in the form of a label. In some embodiments, the acceptable candidate check digit is printed in response to storing that check digit in the check digit data file and/or database. Alternatively, the acceptable candidate check digit is automatically printed in response to merely determining that it was acceptable.

The determination of whether a candidate check digit is acceptable in block 220 of FIG. 6 may include a multiple level inquiry or evaluation, some criteria of which may be disabled. In particular, it may be advantageous for a candidate check digit to be different from any excluded check digit or different from the current check digit at a particular location. Optionally, it may be advantageous for a candidate check digit to be different from a check digit at the same location in a different area. It may also be advantageous for a candidate check digit to be different from a check digit of a related location having an anagrammatic location identifier. It may also be advantageous for a candidate check digit to be different from a check digit of a related location number that has a location identifier that is only different by one character or less from the selected location number.

Figure 7:
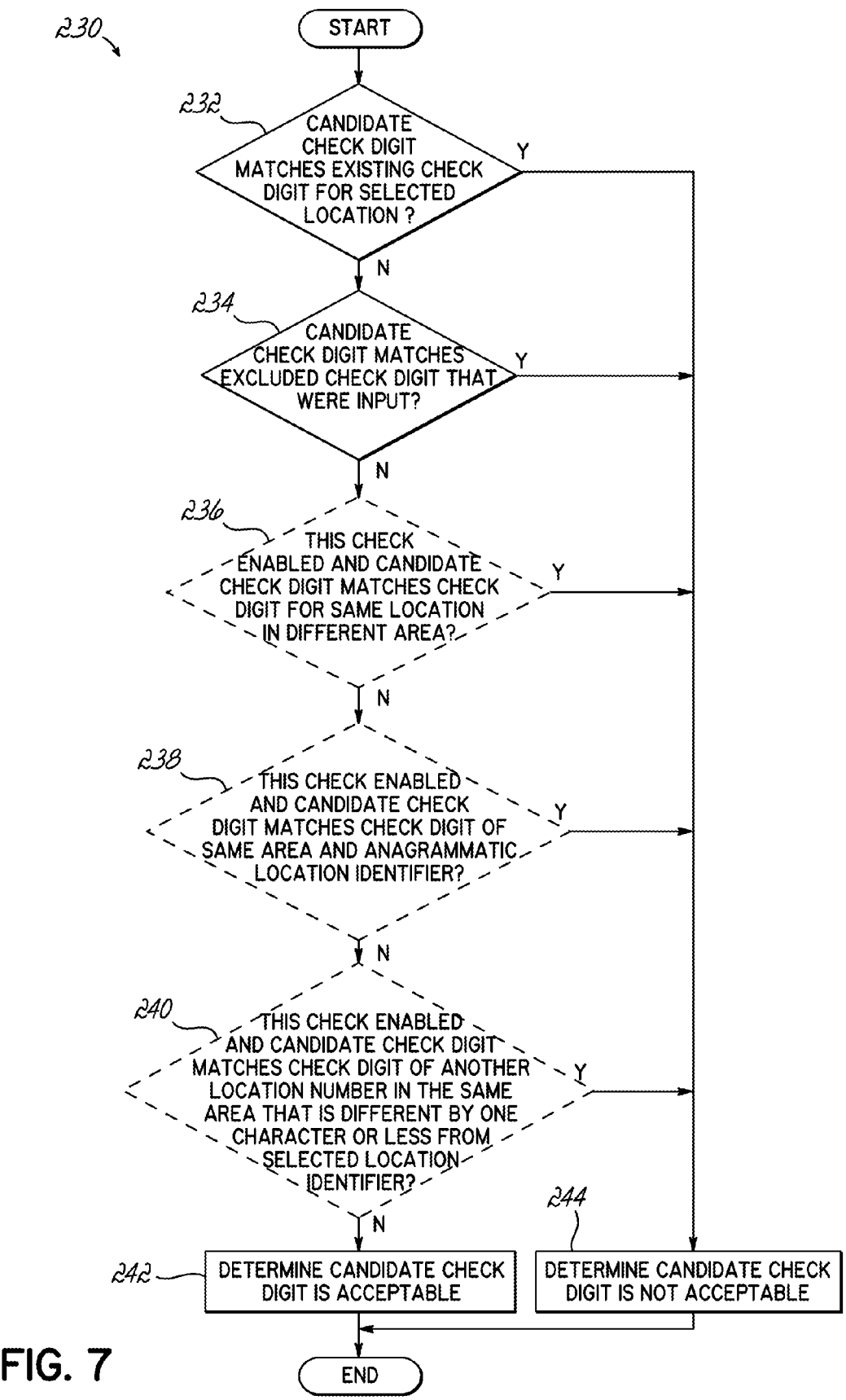
FIG. 7 is a flowchart illustrating a sequence of operations that may be executed by the portable computer of mobile system of FIG. 1 that further illustrates the determination of whether a particular check digit is acceptable to use at a location.

Correspondingly, FIG. 7 is a flowchart 230 illustrating a sequence of operations that may occur in evaluation block 220 of FIG. 6 for the computer and/or the mobile system to determine whether a candidate check digit is acceptable consistent with embodiments of the invention. In particular, it may be initially determined whether the candidate check digit matches an existing check digit for the selected location or current location at issue (block 232). For example, if a check digit "65" is currently associated with the selected location Aisle 1, Slot 123, a check is made initially to make sure that the candidate check digit is not also "65" for use in the selected location Aisle 1, Slot 123. When the candidate check digit does not match the existing check digit for the selected location ("No" branch of decision block 232), then that candidate may proceed for additional evaluation and verification.

Next, as illustrated by block 234, the candidate check digit may be checked to make sure it does not match an excluded check digit. For example, one or more excluded check digits, as provided by a user per block 208 of FIG. 6, might be compared to the candidate check digit. If no excluded check data was entered by the user, step 234 might be skipped.

Proceeding, the candidate check data is evaluated for a match against check data for a related location. The related location might be defined or determined, as noted herein, as based on the identifier for the selected location (e.g., slot number). The invention provides a way to generate check data that prevents or reduces errors by a worker. Various evaluation steps may be selected in the system. If the check or evaluate step is enabled, the program flow proceeds as in FIG. 7, for evaluating the candidate check data. For example, when the candidate check digit does not match an excluded check digit ("No" branch of decision block 234), it may be optionally determined whether the candidate check digit matches a check digit for a similar location in a different area (block 236). This particular determination is a recognition that it is advantageous to take into account the physical layout of the location or warehouse. For example, there may be an aisle or section "1" with slot numbers in a range that matches the slot number range of a different area, such as an aisle or section "2". The check/verification of block 236 ensures that the same locations in different areas have different check digits. For example, block 236 ensures that in a warehouse with multiple aisles or other areas, the candidate check digits for Aisle 2, Slot 123 are different from and do not match the existing check digits for Aisle 1, Slot 123. That is, matches for the same location (slot number 123), but different areas (Aisle 2 versus Aisle 1) are avoided.

If the candidate check digit passes the test of block 236 (or if block 236 is not enabled), the candidate might also be optionally compared to the check digit at a related location that has an anagrammatic location identifier or number with respect to the location identifier for the selected location. For example, the candidate check digit for the selected location and slot number that is to be modified may be compared to the check digit of a slot number that is anagrammatically related to the slot number of a selected location. For example, if "65" is a candidate check digit for the selected slot number 123, and the slot number 132 in the same aisle/section or area has check digits "65" as well, then the candidate check digit would be rejected. Therefore, according to block 238, the candidate check digit is compared to see if it is a match to the check digit of the anagrammatic related location number in the same area. As may be appreciated, various different anagrammatic number relationships might be checked in the test of the invention indicated by block 238. As such, the invention is not limited to a specific example or embodiment of the anagrammatic relationship between the selected location and slots or locations that might be within the same general area, such as the same aisle/section of the workspace.

Referring again to FIG. 7, if the candidate check digit is still acceptable passing through the verification or selection blocks of 232-238 (or certain of those checks are not enabled), further evaluation for similarities between check data and locations in the same area as the selected location might be made. For example, rather than the anagrammatic relationship, as tested or verified in block 238, a slight difference in the location identifier might be checked in order to prevent a check digit of the selected location that matches the check digit of another closely related location in the same area. For example, the verification test made in block 240 might check for any matching check digits on location slot numbers in an area that differ in only one character or less. For example, if the candidate check digit for the selected slot number 123 in a particular aisle/section is the value "29", and different but related slot number 133 in the same aisle/section has check digits "29" as well, then the candidate check digit would be rejected based on that match. If the candidate check digit matches in such a way, as defined by one of the check or evaluation blocks 232-240, it is indicated as not acceptable via block 244. If there is no match in such a situation, and all of the various verifications and tests of the invention have been satisfied, the candidate check digit would be indicated as acceptable per block 242.

Accordingly, in the various verification steps provided in process 230 of FIG. 7, a candidate check digit is checked initially just to make sure that it does not duplicate any existing check digit that is supposed to be replaced and also does not match up with any check digits that are specifically to be excluded per the instructions of the user. Thereafter, the check digits for the same location in a different yet close area, or the check digits in the same area for slightly different locations, are taken into account in order to verify the candidate check digit as acceptable.

As will be understood by a person of ordinary skill in the art, the proximity of the different but close locations might have a threshold or some other criteria associated therewith to ensure that different areas that are far enough away are not taken into consideration in the evaluation so as to not make it too difficult to find an acceptable candidate check digit. For example, a different area might have to be within one or two aisles of the aisle that contains the selected location. Similarly, the proximity or relationship to the selected location of other close locations within the same area (blocks 238, 240) might also be subject to specific criteria or thresholds. For example, the anagrammatic location identifier or number might have to be anagrammatic with respect to just two of the digits. Similarly, a location number might be different from the existing selected location number by more than one character (block 240), but a suitable character differential may be utilized between location identifiers that does not unreasonably exclude candidate check digits. The possibility of confusion by a user would be taken into account with respect to the similarities or dissimilarities between locations in the same area, such as the same aisle or section of a warehouse that are used for the evaluation.

As an illustrative example of an embodiment of the invention, the selected sequence might contain 10 candidate check digits: 07, 16, 87, 65, 01, 83, 29, 69, 15, 49 for a selected location Aisle 2, slot number 134. The last used candidate check digit from the last activation of the invention process was index 3 ("87"). The user activates the process and specifies "65" and "83" as excluded values. The invention and algorithm begins at index 4, which is candidate 65. The candidate check data "65" is an excluded value, so the sequence index proceeds to index 5 ("01"). The candidate check data "01" is not an excluded value, but suppose that check data "01" fails one of the other checks or tests of FIG. 7. For example, check data "01" might match the check data from Aisle 2, slot 143 (anagram of 134). Processing proceeds to index 6 ("83"). The value "83" is also an excluded value, so processing goes to index 7 ("29"). This is not an excluded value. Then, if "29" passes the other checks from FIG. 7 as well, then "29" becomes the new check digit for the selected location. Note that at the next activation of the process, the first candidate will be index 8 ("69"), unless the user opts to select a different sequence before activating the process again. Note also that if there had been more than 5 rejections, then the process would abort per FIG. 6 Box 222.

In light of the foregoing, embodiments of the invention represent a comprehensive integrated solution to what is currently a primarily manual process to generate, verify, and print check digits. By combining hardware and software into a portable computer and/or mobile system, aspects of check digit generation, verification, and printing are performed at the location where the check digit will appear. Moreover, the prevention of duplicate check digits works for a specific location or for all locations in which the system is used. Confusing scenarios for anagrammatic locations or only slightly different locations in the same area are avoided. Conventional approaches are not known to afford direct protection against duplication, let alone more advanced protection again similarity between check digits.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, check digits may include alphanumeric characters, and thus be referred to as "check data."

As such, the invention in its broader aspects is therefore not limited to the specific details, apparatuses, and methods shown and described. A person having ordinary skill in the art will appreciate that any of the blocks of the above flowcharts may be deleted, augmented, made to be simultaneous with another, combined, looped, or be otherwise altered in accordance with the principles of the embodiments of the invention. Accordingly, departures may be made from such details without departing from the scope of applicants' general inventive concept.

The invention claimed is:

1. A method, comprising:
   prompting, with a device, a user to input an identifier for a selected location within an area of a workspace using a voice-enabled task management system comprising the device;
   receiving, with the voice-enabled task management system, the identifier for a selected location that has check data associated therewith;
   generating, with the voice-enabled task management system, candidate check data for potential use with the selected location;
   comparing, with the voice-enabled task management system, the candidate check data against (i) existing check data for the selected location, and (ii) check data associated with a related location in the same area as the selected location indicated by a location identifier that is anagrammatic with respect to the identifier of the selected location;
   based on the comparison, evaluating, with the voice-enabled task management system, whether the candidate check data matches either the existing check data for the selected location or the check data associated with the related location;
   based on the evaluation, determining, with the voice-enabled task management system, whether the candidate check data is acceptable for use for the selected location; and
   setting, with the voice-enabled task management system, the candidate check data for the selected location if the check data is determined to be acceptable.

2. The method of claim 1, comprising, if no match exists in the evaluation, determining that the candidate check data is acceptable for use for the selected location and if a match exists, determining that the candidate check data is unacceptable for use for the selected location.

3. The method of claim 1, comprising, if the candidate check data is unacceptable, generating further candidate check data for evaluation.

4. The method of claim 1, comprising:
   receiving an input indicative of a sequence of candidate check data; and
   generating candidate check data for the selected location from the sequence.

5. The method of claim 4, comprising indexing through the sequence of candidate check data each time candidate check data is determined as acceptable or unacceptable for selecting the next available candidate check data in the sequence.

6. The method of claim 1, comprising storing the acceptable candidate check data in memory for the selected location.

7. The method of claim 1, wherein the device comprises a headset.

8. The method of claim 7, wherein the headset comprises a microphone for voice data entry and an ear speaker for audio output feedback.

9. The method of claim 1, wherein the device comprises a display.

10. An apparatus, comprising:
   at least one processing unit; and
   a memory;
   program code resident in the memory, the program code configured to be executed by the at least one processing unit for:
      prompting, with a device, a user to input an identifier for a selected location within an area of a workspace using a voice-enabled task management system comprising the device;
      receiving, with the voice-enabled task management system, the identifier for a selected location that has check data associated therewith;
      generating, with the voice-enabled task management system, candidate check data for potential use with the selected location;
      determining a related location in the same area as the selected location that is anagrammatic with respect to the identifier of the selected location;
      evaluating the candidate check data for a match against (i) existing check data for the selected location, and (ii) check data associated with the related location;

based on the evaluation, determining whether the candidate check data is acceptable for use for the selected location; and setting the candidate check data for the selected location if the check data is determined to be acceptable.

11. The apparatus of claim 10, wherein the program code is configured, if no match exists in the evaluation, for determining that the candidate check data is acceptable for use for the selected location, and if a match exists, for determining that the candidate check data is unacceptable for use for the selected location.

12. The apparatus of claim 10, wherein the program code is configured, if the candidate check data is unacceptable, for generating another candidate check data for evaluation.

13. The apparatus of claim 10, wherein the device comprises a headset.

14. The apparatus of claim 13, wherein the headset comprises a microphone for voice data entry and an ear speaker for audio output feedback.

15. The apparatus of claim 10, wherein the device comprises a display.

16. A method, comprising:
prompting, with a device, a user to input an identifier for a selected location within an area of a workspace using a voice-enabled task management system comprising the device;

receiving, with the voice-enabled task management system, the identifier for a selected location that has check data associated therewith;

generating, with the voice-enabled task management system, candidate check data for potential use with the selected location;

comparing, with the voice-enabled task management system, the candidate check data against (i) existing check data for the selected location, and (ii) check data associated with a related location in the same area as the selected location indicated by a location identifier that is anagrammatic with respect to the identifier of the selected location;

based on the comparison, evaluating, with the voice-enabled task management system, whether the candidate check data matches either the existing check data for the selected location or the check data associated with the related location;

based on the evaluation, determining, with the voice-enabled task management system, whether the candidate check data is acceptable or unacceptable for use for the selected location;

and if the candidate check data is determined unacceptable, repeating, a certain number of times or until the candidate check data is acceptable, the steps of generating candidate check data, evaluating the candidate check data, and determining whether the candidate check data is acceptable or unacceptable for use for the selected location; and setting, with the voice-enabled task management system, the candidate check data for the selected location if the check data is determined to be acceptable.

17. The method of claim 16, comprising, if no match exists in the evaluation, determining that the candidate check data is acceptable for use for the selected location and if a match exists, determining that the candidate check data is unacceptable for use for the selected location.

18. The method of claim 16, comprising storing the acceptable candidate check data in memory for the selected location.

19. The method of claim 16, wherein the device comprises a headset.

20. The method of claim 17, wherein the headset comprises a microphone for voice data entry and an ear speaker for audio output feedback.

* * * * *